(12) United States Patent
Shigeta et al.

(10) Patent No.: US 9,873,355 B2
(45) Date of Patent: Jan. 23, 2018

(54) AUTOMATIC ADJUSTER, AUTOMATIC ADJUSTING SYSTEM AND AUTOMATIC ADJUSTING METHOD

(71) Applicant: Mitsubishi Electric Corporation, Tokyo (JP)

(72) Inventors: Asako Shigeta, Tokyo (JP); Takuji Morimoto, Tokyo (JP); Takahisa Aoyagi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 24 days.

(21) Appl. No.: 15/119,094

(22) PCT Filed: Apr. 25, 2014

(86) PCT No.: PCT/JP2014/061725
§ 371 (c)(1),
(2) Date: Aug. 15, 2016

(87) PCT Pub. No.: WO2015/162781
PCT Pub. Date: Oct. 29, 2015

(65) Prior Publication Data
US 2017/0050542 A1 Feb. 23, 2017

(51) Int. Cl.
*B60N 2/16* (2006.01)
*G02B 27/01* (2006.01)
*B60K 35/00* (2006.01)

(52) U.S. Cl.
CPC ............. *B60N 2/16* (2013.01); *B60K 35/00* (2013.01); *G02B 27/0149* (2013.01);
(Continued)

(58) Field of Classification Search
CPC .............. B60K 35/00; B60K 2350/965; B60K 2350/901; B60K 2350/2052;
(Continued)

(56) References Cited

U.S. PATENT DOCUMENTS 9,298,985 B2 * 3/2016 Krueger ................. G01C 23/00
9,466,161 B2 * 10/2016 Ricci ..................... G06Q 30/012
(Continued)

FOREIGN PATENT DOCUMENTS

JP        6-262982 A    9/1994
JP        3019654 B2    3/2000
(Continued)

*Primary Examiner* — Atul Trivedi
(74) *Attorney, Agent, or Firm* — Birch, Stewart, Kolasch & Birch, LLP

(57) ABSTRACT

An automatic adjuster, when carrying out an AR superimposed display using a head-up display in a vehicle like a car, is able to perform eye position adjustment for the AR superimposition automatically without increasing a burden to a driver by controlling, according to the eye position information acquired from an eye position detector, in such a manner as to shift the driver's eye position in accordance with the reference position of the superimposed display, which serves as a position where the AR superimposition is performed appropriately, and by controlling a movable part of the driver's power seat the driver of the vehicle takes.

10 Claims, 14 Drawing Sheets

(52) U.S. Cl.
CPC ............ *B60K 2350/1072* (2013.01); *B60K 2350/2052* (2013.01); *B60K 2350/352* (2013.01); *B60K 2350/901* (2013.01); *B60K 2350/965* (2013.01); *G02B 2027/0159* (2013.01)

(58) Field of Classification Search
CPC ...... B60K 2350/1072; B60K 2350/352; B60N 2/16; G02B 2027/0159; G02B 27/01; G02B 27/0149
USPC .......................................................... 701/49
See application file for complete search history.

(56) References Cited

U.S. PATENT DOCUMENTS

| | | | |
|---|---|---|---|
| 9,688,163 B2* | 6/2017 | Hotary | B60N 2/665 |
| 2008/0158096 A1* | 7/2008 | Breed | B60N 2/002 |
| | | | 345/7 |
| 2012/0086249 A1* | 4/2012 | Hotary | B60N 2/0228 |
| | | | 297/284.3 |
| 2013/0027426 A1* | 1/2013 | Sasaki | B60K 35/00 |
| | | | 345/629 |
| 2016/0280098 A1* | 9/2016 | Frye | B60N 2/0228 |
| 2017/0075701 A1* | 3/2017 | Ricci | G06F 9/4443 |
| 2017/0237946 A1* | 8/2017 | Schofield | H04N 7/183 |
| | | | 348/148 |

FOREIGN PATENT DOCUMENTS

| | | |
|---|---|---|
| JP | 2008-189203 A | 8/2008 |
| JP | 2009-262666 A | 11/2009 |
| JP | 2010-143343 A | 7/2010 |

\* cited by examiner

FIG.2
(a)
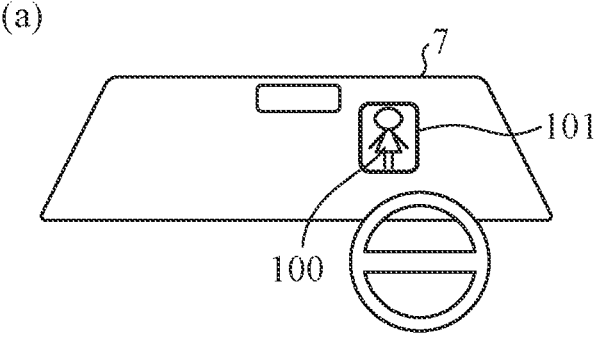
(b)
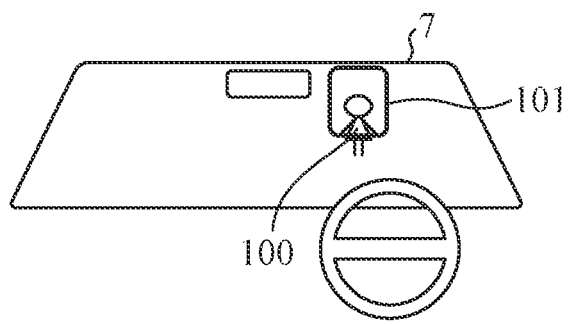

FIG.3
(a)
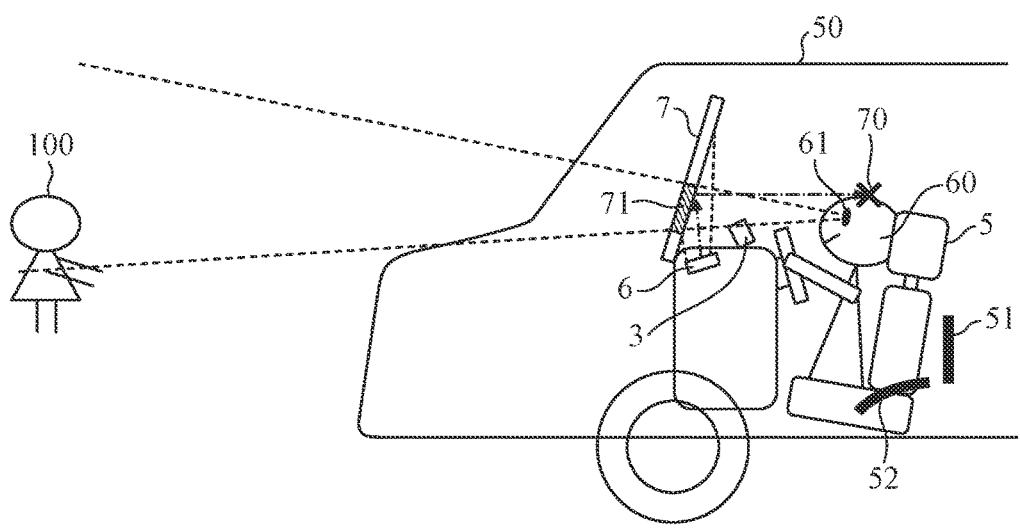
(b)
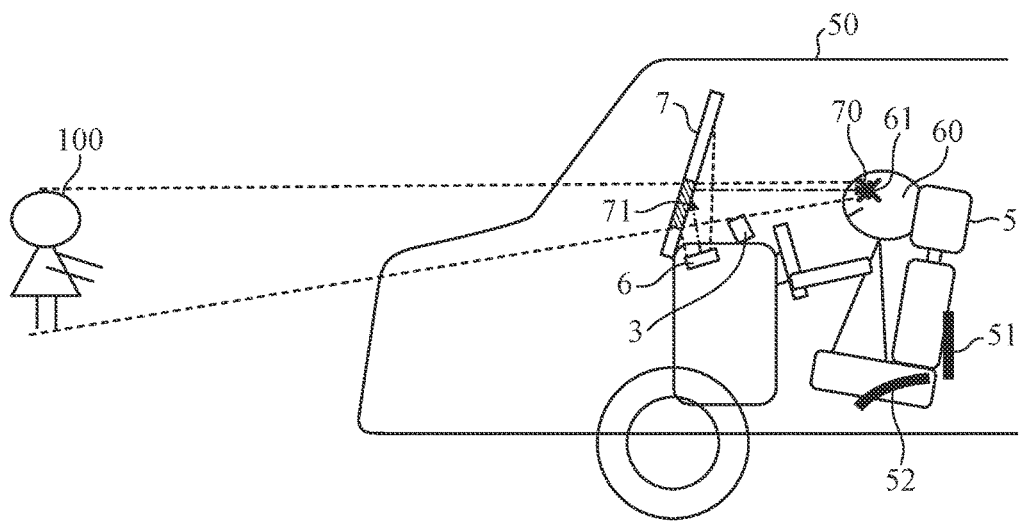

FIG.4
(a)
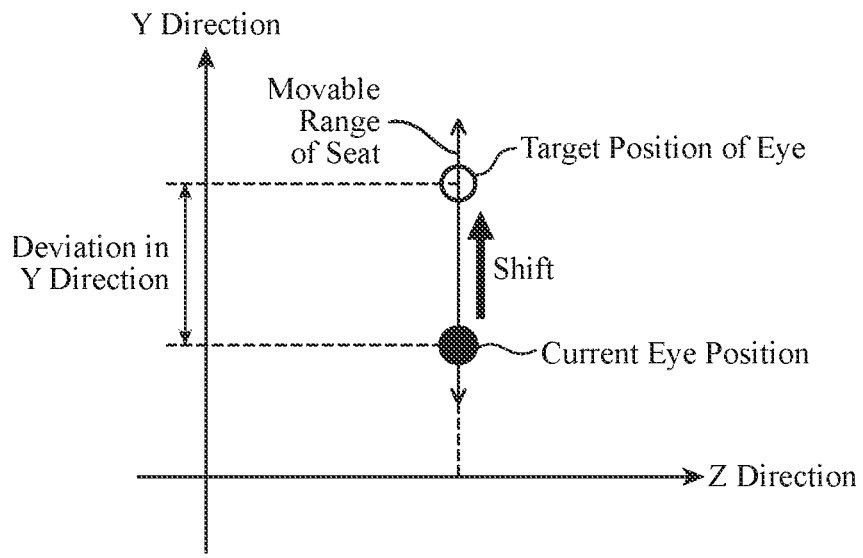
(b)
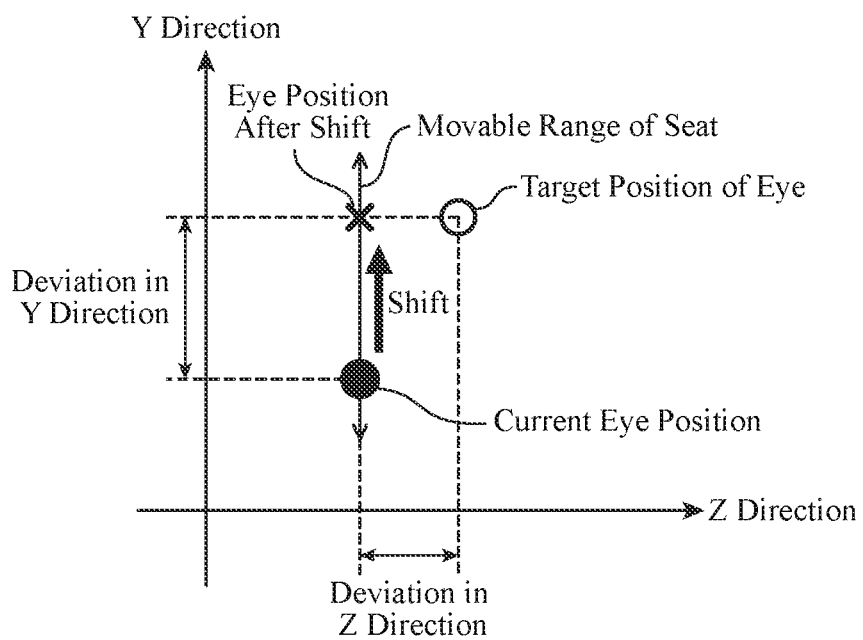

ing system and automatic adjusting method capable of automatically adjusting the driver's eye position when carrying out the AR display using the HUD in a vehicle like a car.

AUTOMATIC ADJUSTER, AUTOMATIC ADJUSTING SYSTEM AND AUTOMATIC ADJUSTING METHOD

TECHNICAL FIELD

The present invention relates to an automatic adjuster, automatic adjusting system and automatic adjusting method for adjusting a driver's eye position in a vehicle like a car.

BACKGROUND ART

Formerly, an apparatus has been known which adjusts a vehicle part like a door mirror independently of the posture of a driver or individual differences in a vehicle like a car.

For example, Patent Document 1 discloses an automatic adjuster which has a built-in camera that detects driver's eyes in a part like a door mirror itself in a vehicle like a car, and which adjusts the position and angle of the part like the door mirror in such a manner that the driver's eye position agrees with a preset reference position.

However, in the conventional apparatus as shown in the Patent Document 1, for example, since the camera is set at the part like a door mirror (a door mirror, a rearview mirror, an air vent of an air conditioner and the like), unless the driver looks in the direction of these devices, it cannot detect the driver's eyes, and hence cannot carry out the position adjustment. In addition, to implement the automatic position adjustment function with a plurality of devices, both a camera and a movable part have to be provided to each device, resulting in an increase of its cost.

On the other hand, many systems have been proposed recently which carry out AR (Augmented Reality) display for marking an obstacle or warning of it, or other information using a head-up display (HUD) in a vehicle like a car. Since the AR display using the HUD can collect the line-of-sight of a driver in a forward direction as compared with a conventional meter display or center display, it is expected to improve the safety.

PRIOR ART DOCUMENT

Patent Document

Patent Document 1: Japanese Patent Laid-Open No. 6-262982/1994.

DISCLOSURE OF THE INVENTION

Problems to be Solve by the Invention

However, the AR display using the HUD has a problem in that the seat position or the reference position of the AR display must be adjusted manually every time a driver changes to carry out the AR superimposed display without deviation because when the driver's eyes deviate from a given position (reference position), the marking or warning is not superimposed at the intended place.

In addition, there is another problem in that the technique of performing the reference position adjustment of a part like the door mirror automatically just as the conventional apparatus shown in the Patent Document 1 performs, for example, cannot be applied to the AR display using the HUD.

The present invention is implemented to solve the foregoing problems. Therefore it is an object of the present invention to provide an automatic adjuster, automatic adjusting system and automatic adjusting method capable of automatically adjusting the driver's eye position when carrying out the AR display using the HUD in a vehicle like a car.

Means for Solving the Problems

To accomplish the foregoing object, according to the present invention, an automatic adjuster is provided which is capable of automatically shifting a driver's seat a driver of a vehicle takes, and the automatic adjuster includes a deviation calculator to calculate a deviation between a measured value of a height of the driver's eye position when the driver takes the seat and a height of a predetermined reference position in a superimposed display which is displayed on a head-up display equipped in the vehicle, a shift amount calculator to calculate, when the deviation calculated by the deviation calculator is not less than a predetermined value, a shift amount by which the seat is to be shifted in a direction that reduces the deviation, and a position controller to control a shift of the seat by giving a driving instruction to a seat actuator capable of driving and shifting the seat in accordance with the shift amount calculated by the shift amount calculator, thereby adjusting the height of the driver's eye position and the height of the reference position in the superimposed display when the driver takes the seat.

Advantages of the Invention

According to the automatic adjuster in accordance with the present invention, when carrying out the AR superimposed display using the head-up display in the vehicle like a car, the automatic adjuster is able to perform the eye position adjustment for the AR superimposition automatically without increasing a burden to the driver by controlling, according to the eye position information acquired from the eye position detector, in such a manner as to shift the driver's eye position in accordance with the reference position of the superimposed display, which serves as the position where the AR superimposition is performed appropriately, and by controlling a movable part of the driver's power seat the driver of the vehicle takes.

BRIEF DESCRIPTION OF THE DRAWINGS

FIGS. 2(a) and 2(b) are diagrams illustrating a deviation between an object to be confirmed visually by a driver and an AR display frame (AR marker) in an AR display using an HUD;

FIGS. 3 (a) and 3(b) are diagrams illustrating a setup image of the automatic adjuster;

FIGS. 4(a) and 4(b) are diagrams illustrating a shift example of a seat 5 by a seat rail 51, and a relationship between a target point of the eye position and the present eye position;

BEST MODE FOR CARRYING OUT THE INVENTION

The best mode for carrying out the invention will now be described with reference to the accompanying drawings.

The present invention relates to an automatic adjuster, an automatic adjusting system and an automatic adjusting method capable of automatically shifting the driver's seat, in which a driver of a vehicle sits, at least in a height direction. To perform the automatic adjustment of the driver's eye position when carrying out an AR (Augmented Reality) display using a head-up display (HUD) in a vehicle like a car, it adjusts the position of the driver's seat by automatically shifting it.

Embodiment 1

Figure 1:
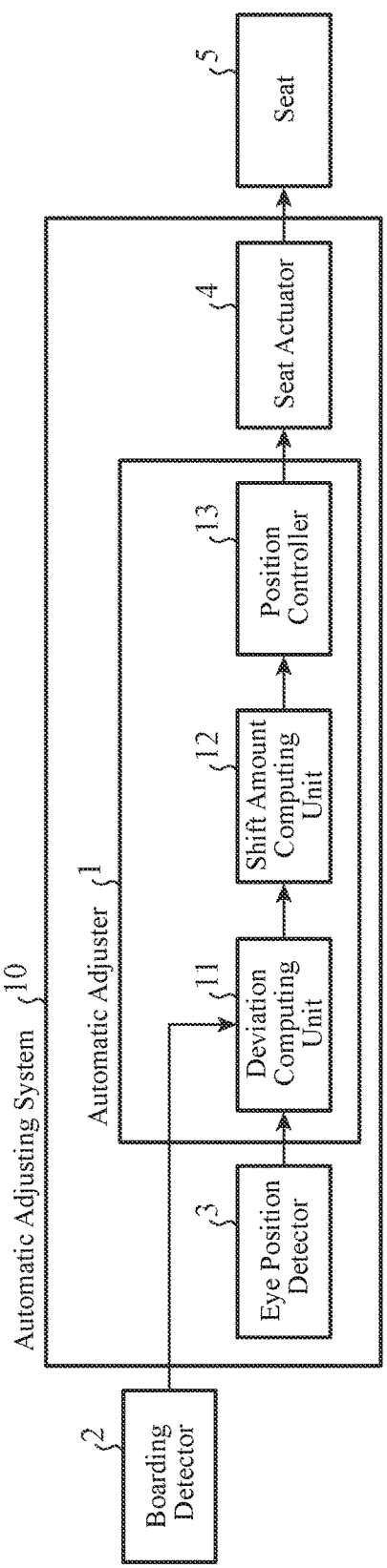
FIG. 1 is a block diagram showing an automatic adjuster of an embodiment 1 and an example of peripheral devices connected thereto.

FIG. 1 is a block diagram showing an automatic adjuster of an embodiment 1 and an example of peripheral devices connected thereto. The automatic adjuster 1 comprises a deviation computing unit 11, a shift amount computing unit 12 and a position controller 13; and a boarding detector 2, an eye position detector 3 and a seat actuator 4 are connected thereto. In addition, the seat actuator 4 is connected to a seat (power seat) 5.

Here, the automatic adjuster 1, eye position detector 3 and seat actuator 4 constitute an automatic adjusting system 10 of the seat.

The boarding detector 2 detects whether a driver has got in the car or not, that is, a riding state of the driver. The decision as to the riding state of the driver can be made by a method of setting a pressure sensor in the driver's seat 5 and detecting a point where the pressure on the seat 5 varies greatly, by a method of detecting with a camera which will be described below, by a method of detecting the boarding by detecting a key-on, and by other detecting methods.

Incidentally, for convenience, it is assumed in the following description that when looking at the driver from the front of the vehicle, a two-dimensional plane in the vertical and lateral directions at a position where the driver sits in the seat is referred to as a plane at the sitting position of the driver, and that the lateral direction is made an X axis and the vertical direction Y axis. In addition, as for the shift of the plane at the sitting position in the longitudinal direction of the vehicle, it is referred to as a shift along the Z axis.

The eye position detector 3 detects the driver's eye position in real time when the driver takes the seat 5. Here, the eye position detector 3 is assumed to be a camera set in front of the driver, which acquires a driver's face image that makes known a relative positional relationship of the driver's eyes with equipment in the vehicle, and which detects the driver's eye position by the image processing thereof.

Alternatively, a configuration is also possible which uses a stereo camera, for example, and detects the driver's eye position including the depth in the longitudinal direction of the vehicle. In addition, even a single camera can detect the driver's eye position if it has a setting information about the direction in which the camera is equipped. Incidentally, other methods can be used for the detection.

The deviation computing unit 11 acquires the driver's eye position detected by the eye position detector 3, and calculates the deviation between the measured value of the driver's actual eye position (present eye position) and a target point of the eye position.

Here, the term "target point of the eye position" refers to a predetermined reference position in the AR superimposed display which is displayed on the HUD equipped in the vehicle, that is, the driver's eye position where the AR superimposed display is superimposed optimally, and is determined by three-dimensions of (X, Y, Z).

Generally, it is supposed that the driver faces the front (ahead of the vehicle) most of the driving. Thus, the height of the target point of the eye position (reference position) can be assumed to be equal to the height of the position of the predetermined superimposed display which is displayed on the HUD.

Thus, by causing the center position (reference position) of the superimposed display which is displayed on the HUD to agree with the height of the driver's eye position, the superimposed display which is displayed on the HUD is adjusted so as to agree with the position of the object.

FIG. 2 is a diagram illustrating a deviation between an object the driver is to confirm visually and an AR display frame (AR marker) on the AR display using the HUD, and shows a state in which the driver looks ahead of the vehicle. As shown in FIG. 2, the HUD (windshield HUD) 7 is set on the windshield at the front of the vehicle, and the AR display frame (AR marker) 101 which is a display image for HUD, is projected thereon to be AR superimposedly displayed on the object 100 to make markings or warnings.

At this time, if the driver's eye position agrees with the target point (reference position), the AR marker 101 is superimposedly displayed in such a manner as to surround the object 100 as shown in FIG. 2(*a*). However, if the driver's eye position disagrees with the target point (reference position), the AR marker 101 is not superimposed upon the intended place as shown in FIG. 2(*b*).

FIG. 3 is a diagram illustrating a setup image of the automatic adjuster in accordance with the present invention. In FIG. 3, it is supposed that the left-hand side of FIG. 3 is the direction of travel of the vehicle 50, and that the object 100 the driver 60 is to confirm visually is present ahead of the vehicle 50. The HUD (windshield HUD) 7 is set on the windshield of the vehicle 50, and the eye position detector 3 for detecting the position of the eyes 61 of the driver 60 is equipped in front of the driver's seat 5.

In addition, an HUD light source 6 for projecting an AR display frame onto the HUD 7 is equipped in the dashboard, for example, and the AR display frame (AR marker) 101 as shown in FIG. 2, for example, is superimposedly displayed upon the AR marker display position 71 of the HUD 7.

Incidentally, although the windshield projection type HUD 7 is used here, a system is also possible which has a transparent plastic sheet fixed on a sun visor, and which projects upon it the AR display frame (AR marker) 101 that is a display image for the HUD.

Then, if the position of the eyes 61 of the driver 60 is lower than the reference position 70 as shown in FIG. 3(a), the AR marker 101 is displayed as shown in FIG. 2(b) at a position shifted from the object 100 when seen from the driver 60.

Thus, as shown in FIG. 3(b), the driver's seat 5 is adjusted in such a manner that the height of the eyes 61 of the driver 60 agrees with the height of the reference position 70.

The shift amount computing unit 12 calculates the shift amount of the sitting position in accordance with the deviation calculated by the deviation computing unit 11 and the movable range of the seat 5. More specifically, when the deviation calculated by the deviation computing unit 11 is not less than a predetermined value, the shift amount computing unit 12 calculates the shift amount for moving the seat 5 in the direction that will reduce the deviation.

For example, as for the seat 5 which has a seat rail 51 that enables the seat 5 to shift only in the Y axis direction (height direction) as shown in FIG. 3 and is movable only in the Y axis direction, the shift amount computing unit 12 can use the deviation in the height direction (Y axis direction) calculated by the deviation computing unit 11 as the shift amount of the seat 5 without change.

FIG. 4 is a diagram illustrating a shift example of the seat 5 using the seat rail 51, and a relationship between a target point of the eye position and the present eye position. In FIG. 4, it means that the driver's eye position becomes higher as it separates farther in the Y axis direction from the origin, and that the driver's eye position shifts rearward of the vehicle as it separates farther in the Z axis direction from the origin.

FIG. 4(a) shows that since the present eye position (the position indicated by the closed circle in FIG. 4) is lower (less in the Y direction) than the target point (the point indicated by the open circle in FIG. 4), shifting the seat 5 in the upper direction (increasing direction in the Y direction) can cause the eye position after the shift to agree with the target point. In addition, the shift amount of the seat 5 in this case is exactly the deviation in the Y axis direction.

In this case, however, if the driver's seat 5 deviates forward (in the decreasing direction in the Z axis direction), since the seat movable range is definite, it is conceivable that even if the seat 5 is shifted, there is a case where the driver's eye position does not agree with the target point. FIG. 4(b) shows a case where the present eye position (position indicated by the closed circle in FIG. 4) is lower (smaller in the Y direction) than the target point (position indicated by the open circle in FIG. 4), and hence even though the height of the eye position (indicated by the cross in FIG. 4) after shifting the seat 5 in the upper direction (increasing direction in the Y direction) agrees with the height of the target point after the shift, a deviation occurs in the Z axis direction.

In this case, since the eye position after the shift deviates from the target point in the Z axis direction, the AR display frame (AR marker) 101 becomes larger (or smaller) to some extent. However, since it is superimposedly displayed at the position to be displayed, the present embodiment 1 considers this without any problem. Thus, it is enough for the shift amount computing unit 12 to calculate the shift amount of the seat 5 so as to cancel the deviation only in the Y axis direction having a higher priority than the Z axis direction.

Incidentally, when looking at a driver from the front of a vehicle like a car, although it is probable on the plane where the driver sits (plane at the sitting position of the driver) that the eye position in the height direction (Y axis direction) can vary depending on the individual differences such as the height of the driver and the seat position, once the driver takes the seat 5, the position in the lateral direction (X axis direction) is restricted to some extent and so the driver usually takes like positions in the lateral direction. Accordingly, it is conceivable that the correction mainly in the height direction (Y axis direction) is enough. Thus, the present embodiment 1 will be described on the assumption that no problem arises even though the X axis direction is not considered.

In addition, as for the seat 5 with a seat rail 52 that can shift the seat in both the Y axis direction and Z axis direction with the cooperation of them as shown in FIG. 3, for example, when trying to shift the seat in the Y axis direction (height direction), it is conceivable that the seat can be shifted not only in the Y axis direction (height direction), but also in the Z axis direction (longitudinal direction). In this case also, since the seat movable range is definite, it is conceivable that there are many cases where the driver's eye position does not agree with the target point of the eye position shown in FIG. 3 even if the seat 5 is shifted.

Figure 5:
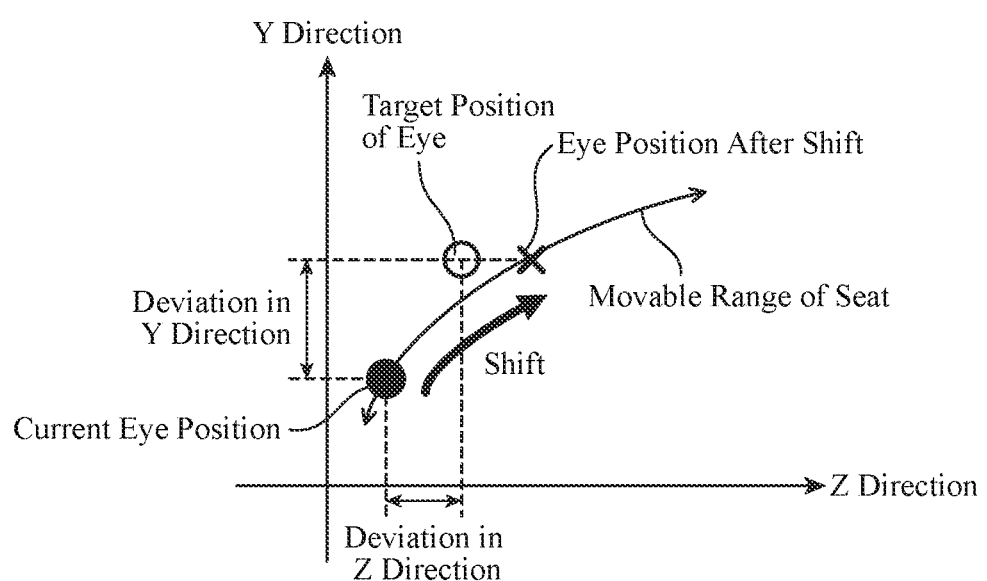
FIG. 5 is a diagram illustrating a shift example of a seat 5 by a seat rail 52, and a relationship between a target point of the eye position and the present eye position.

FIG. 5 is a diagram illustrating a shift example of the seat 5 using the seat rail 52, and a relationship between the target point of the eye position and the present eye position. In FIG. 5 also, it means that the driver's eye position becomes higher as it separates farther in the Y axis direction from the origin, and that the driver's eye position is shifted rearward of the vehicle as it separates farther in the Z axis direction from the origin.

FIG. 5 shows a case where the present eye position (position indicated by the closed circle in FIG. 5) is lower (less in the Y direction) than the target point (position indicated by the open circle in FIG. 5). In this case, although shifting the seat 5 in the upper direction (increasing direction in Y direction) can cause the height of the eye position after the shift (position indicated by the cross in FIG. 5) to agree with the height of the target point, it brings about a deviation in the Z axis direction.

Here, as a result of shifting the seat 5 in such a manner as to cause the height of the driver's eye position to agree with the height of the target point of the eye position in FIG. 5, the seat 5 shifts in the increasing direction along the Z axis direction (toward the rear of the vehicle 50).

In this case also, since the eye position after the shift deviates from the target point in the Z axis direction, the AR display frame (AR marker) 101 becomes smaller (or greater) to some extent. However, since it is superimposedly displayed at the position to be displayed, the present embodiment 1 assumes that it does not cause any problem. Thus, it is enough for the shift amount computing unit 12 to calculate the shift amount of the seat 5 in such a manner as to cancel out the deviation in the Y axis direction having a higher priority than the Z axis direction.

In other words, taking account of the shift of the seat 5 in the Z axis direction, the shift amount computing unit 12 adjusts the driving amount of the seat actuator 4 in such a manner as to cause the height of the driver's eye position to agree with the height of the target point (reference position).

In this case, the shift amount of the seat 5 includes some amount in addition to the deviation in the height direction. If the seat 5 shifts not only in the Y axis direction (height direction), but also in the Z axis direction (longitudinal direction of the vehicle), the driving amount of the seat actuator 4 is corrected in such a manner that the shift amount in the Y axis direction projected onto the plane at the sitting position of the driver becomes equal to the prescribed shift amount (the amount of deviation in the height direction) to adjust it so as to cause the height of the driver's eye position to agree with the height of the reference position in the superimposed display.

The position controller 13 controls the shift of the seat 5 by giving a driving instruction to the seat actuator 4, which is an actuator capable of driving and shifting the seat 5 in accordance with the shift amount calculated by the shift amount computing unit 12, thereby adjusting the height of the reference position of the AR superimposed display and the height of the driver's eye position when the driver takes the seat 5.

The seat actuator 4 shifts the position of the seat 5 along the seat rails by driving it in response to the instruction of the position controller 13.

Then, as described before with reference to FIG. 5, if the seat 5 shifts not only in the height direction (Y axis direction), but also in the longitudinal direction (Z axis direction) of the vehicle when shifted by the seat actuator 4, the position controller 13 adjusts the driving amount to be given to the seat actuator 4 as the instruction considering the shift amount in the longitudinal direction (Z axis direction) of the seat 5.

Next, referring to the flowchart of FIG. 6, the processing flow of the automatic adjuster 1 of the embodiment 1 will be described.

First, when the boarding detector 2 detects that a driver gets in the vehicle, the eye position detector 3 detects the height of the driver's eye position.

Then, when the boarding detector 2 detects that the driver enters the vehicle, the deviation computing unit 11 acquires a measured value of the height of the driver's eye position from the eye position detector 3, and calculates the deviation between the measured value of the height of the driver's eye position acquired and the height of the target point of the eye position (reference position), that is, the deviation in the Y axis direction (height direction) (step ST1).

Next, the shift amount computing unit 12 calculates the sitting shift amount in accordance with the deviation calculated by the deviation computing unit 11 and the movable range of the seat (step ST2).

The position controller 13 controls the seat actuator 4 in accordance with the sitting shift amount calculated by the shift amount computing unit 12, thereby shifting the sitting position (step ST3).

In addition, when completing the processing, the position controller 13 may decide that the adjustment has been finished, and may inform the driver that the driving support is ready by sound or display. Thus, the driver can start driving after confirming that the driving support preparation has been completed.

Figure 6:
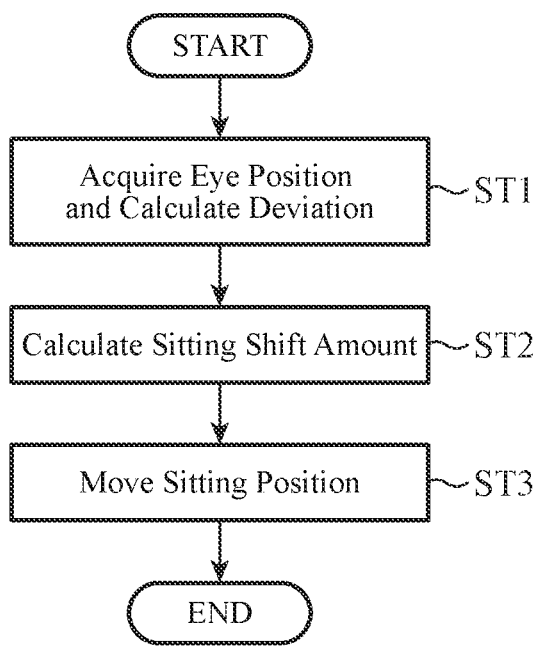
FIG. 6 is a flowchart showing a processing flow of the automatic adjuster of the embodiment 1.

Incidentally, although the processing of the flowchart shown in FIG. 6 is described on the assumption that it is triggered (started) by the sitting of the driver (detecting the boarding of the driver or key-on), and adjusts the driver's eye position automatically, a configuration is also possible which starts the processing after receiving the intent of the driver to adjust the driver's eye position, which is expressed in some form such as pushing an adjustment start button after the driver takes the seat.

Thus, according to the eye position information acquired from the eye position detector 3, the present embodiment 1 can control the movable parts of the power seat 5 in such a manner that the height of the driver's eye position shifts to the height of the target point of the eye position (reference position) where the AR superimposition is carried out appropriately.

This makes it possible to perform the AR display on the HUD appropriately in accordance with a driver even if the height of the driver's eyes varies depending on the difference in a physique of a driver or a habit of a posture in the seat.

Incidentally, to simplify the explanation of the foregoing embodiment, although the description is made on the assumption that when there is a deviation between the measured value of the height of the eye position and the height of the reference position, the embodiment adjusts the height of the eye position in such a manner that the deviation becomes zero, a configuration is also possible which adjusts the height of the eye position in such a manner as to reduce the deviation (to less than a predetermined value, for example) when the deviation is not less than the predetermined value. This holds true in the following embodiments as well.

In addition, a configuration is also possible which decides, when the deviation becomes less than the predetermined value as a result of such adjustment, that the adjustment has been completed, and instructs an output device (such as a display unit, a voice output device, a buzzer, and a light) to inform the driver that the driving support preparation has been completed.

As described above, according to the present embodiment 1, when it performs an AR superimposed display on the head-up display in the vehicle like a car, it can carry out the eye position adjustment for the AR superimposition automatically without increasing a burden to a driver by adjusting in such a manner as to shift the driver's eye position in accordance with the reference position of the superimposed display serving as the position where the AR superimposition is to be made appropriately in accordance with the eye position information acquired from the eye position detector, and by controlling the movable parts of the driver's power seat in which the driver of the vehicle sits. In addition, since the camera is equipped in front of the driver, the present embodiment 1 has an advantage that the driver must look in a specific direction.

Incidentally, the automatic adjuster 1 is implemented as a concrete means in which hardware cooperates with software through a microcomputer that is included in the equipment mounted in the vehicle like a car, to which the automatic adjuster 1 is applied, and that executes programs relating to the specific processing of the present invention. This also applies to the following embodiments.

Embodiment 2

Figure 7:
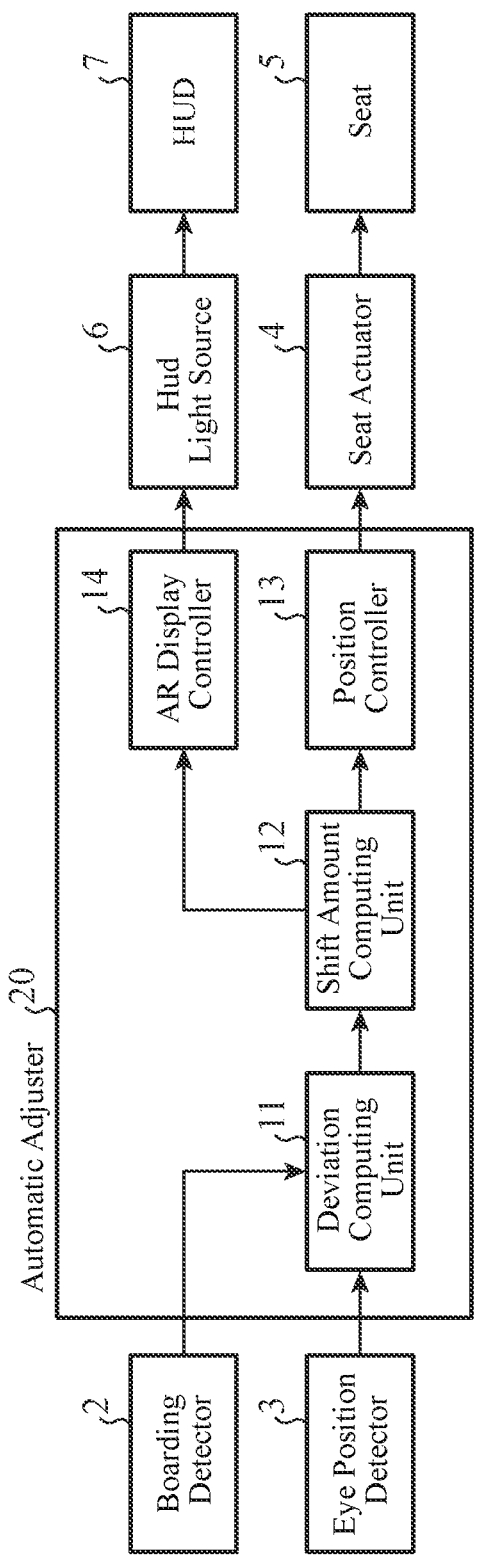
FIG. 7 is a block diagram showing an automatic adjuster of an embodiment 2 and an example of peripheral devices connected thereto.

FIG. 7 is a block diagram showing an automatic adjuster of an embodiment 2 and an example of peripheral devices connected thereto. Incidentally, the same components as those described in the embodiment 1 are designated by the same reference numerals and their redundant description will omitted. The automatic adjuster 20 of the embodiment 2 described below further comprises an AR display controller 14 in addition to the automatic adjuster 1 in the embodiment 1, and the AR display controller 14 is connected to an HUD light source 6.

Incidentally, although not shown in the drawing, the HUD light source 6 comprises a component for drawing an image (drawing controller) and a component for displaying the image (liquid crystal display), and the liquid crystal display displays the AR display frame (AR marker) 101 which is the image drawn by the drawing controller on the HUD 7 so as to emit as a whole the AR display frame (AR marker) 101, an image to be superimposedly displayed on the HUD 7.

The embodiment 1 has a configuration that adjusts the height of the driver's eye position to the height of the target point of the eye position relating to the AR display by adjusting the position of the seat 5.

However, the seat adjustment is not unlimited, but has a limiting value (upper limit or lower limit) naturally for the shift in the vertical direction (height direction). In other words, the seat 5 has a limiting value (upper limit or lower limit) relating to the shift in the height direction.

Accordingly, depending on the driver's physique and posture in the seat, such a case is conceivable where the shift amount calculated by the shift amount computing unit 12 exceeds the limiting value (upper limit or lower limit) of the shift in the height direction, and only the seat adjustment is unable to deal with the case.

Thus, the present embodiment 2, after carrying out basically the same seat adjustment as the embodiment 1 (in addition to the same seat adjustment), the HUD light source 6 that emits an image to be superimposedly displayed on the HUD 7 corrects the drawing form of the image in the height direction so as to enable the AR display appropriately even when the seat adjustment cannot perform sufficient adjustment.

When the deviation between the height of the driver's eye position and the height of the target point (reference position) of the eye position relating to the AR display is not less than the predetermined value, and if the shift amount for shifting the seat 5, which is calculated by the shift amount computing unit, is greater than the limiting value (upper limit or lower limit) of the shift of the seat 5 in the height direction, the AR display controller 14 instructs the HUD light source 6 that emits the image to be superimposedly displayed on the HUD 7 to correct the drawing form of the image in the height direction.

More specifically, if the AR display controller 14 is unable to make the deviation 0 (zero) even if the seat 5 is shifted to the upper limit or lower limit of the seat movable range, the AR display controller 14 instructs the HUD light source 6 to correct the drawing form of the AR display frame (AR marker) 101, the image to be superimposedly displayed on the HUD 7, in the vertical direction (height direction) by the amount corresponding to the insufficiency.

In addition, altering the scaling of the drawing form (correcting the scaling of the drawing form) by the HUD light source 6 makes it possible to correct the position in the Z axis direction (longitudinal direction) as well. Thus, as shown in FIG. 4(b) or FIG. 5 in the embodiment 1, when the deviation in the Z axis direction (longitudinal direction) remains even if the eye position is corrected in the Y axis direction (height direction), the AR display controller 14 instructs the HUD light source 6 to correct the scaling of the drawing form of the image, thereby being able to carry out more appropriate AR display.

Figure 8:
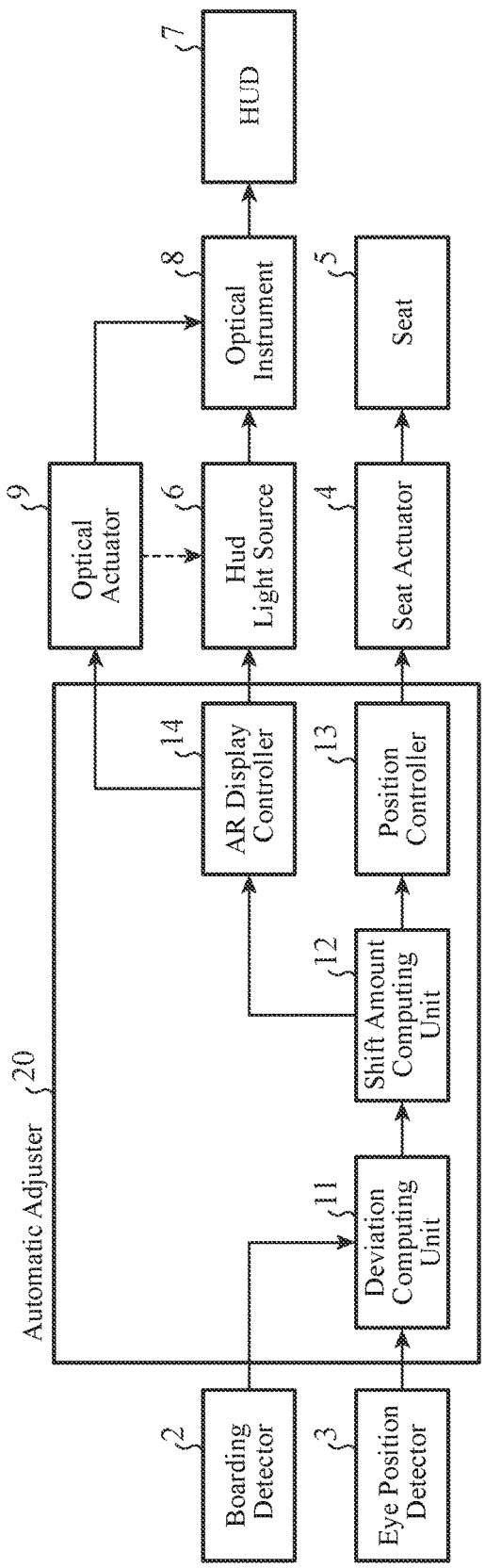
FIG. 8 is a block diagram showing the automatic adjuster of the embodiment 2 and another example of peripheral devices connected thereto.

FIG. 8 is a block diagram showing the automatic adjuster of the embodiment 2 and another example of the peripheral devices connected thereto. As shown in FIG. 8, a configuration is also conceivable which comprises an optical instrument 8 like a lens between the HUD light source 6 and the HUD 7. In this case, the automatic adjuster 20 is connected with an optical actuator 9 for driving the optical instrument 8. Incidentally, the optical instrument 8 is provided for projecting an image emitted from the HUD light source 6 onto the HUD 7.

In this case, the AR display controller 14 can be configured in such a manner as to instruct the optical actuator 9 to enable the optical instrument 8, which projects the image emitted from the HUD light source 6 onto the HUD 7, to correct the AR display frame (AR marker) 101 to be projected onto the HUD 7 by adjusting the reference position of the superimposed display (correcting in the height direction).

Incidentally, since it is undesirable to shift the seat 5 to the limiting value (upper limit or lower limit) of the shift in the height direction, that is, to shift it up to the end of the seat rail such as the seat rail 51 and seat rail 52, a configuration is also possible which carried out the adjustment by appropriately combining the adjustment of the position of the seat 5 with the correction of the drawing form by the HUD light source 6. In addition, a configuration is also possible which performs the adjustment by combining the adjustment of the position of the seat 5, the correction of the drawing form by the HUD light source 6 and the adjustment of the reference position by the optical instrument 8 all together.

In addition, although FIG. 8 shows a block diagram including the optical instrument 8 like a lens and the optical actuator 9 in addition to the HUD light source 6 of the block diagram shown in FIG. 7, a configuration is also possible which comprises the optical instrument 8 and optical actuator 9 instead of the HUD light source 6 of the block diagram shown in FIG. 7. In this case, it is also possible to carry out the adjustment by appropriately combining the adjustment of the position of the seat 5 with the adjustment of the reference position by the optical instrument 8.

Furthermore, if it is possible to shift the position of the HUD light source 6 in at least one of the X axis direction, Y axis direction and Z axis direction, a configuration is also possible which transmits the driving signal from the optical actuator 9 to the HUD light source 6 as indicated by the broken line arrow in FIG. 8. In this case, the optical actuator 9 drives both the optical instrument 8 and HUD light source 6.

Figure 9:
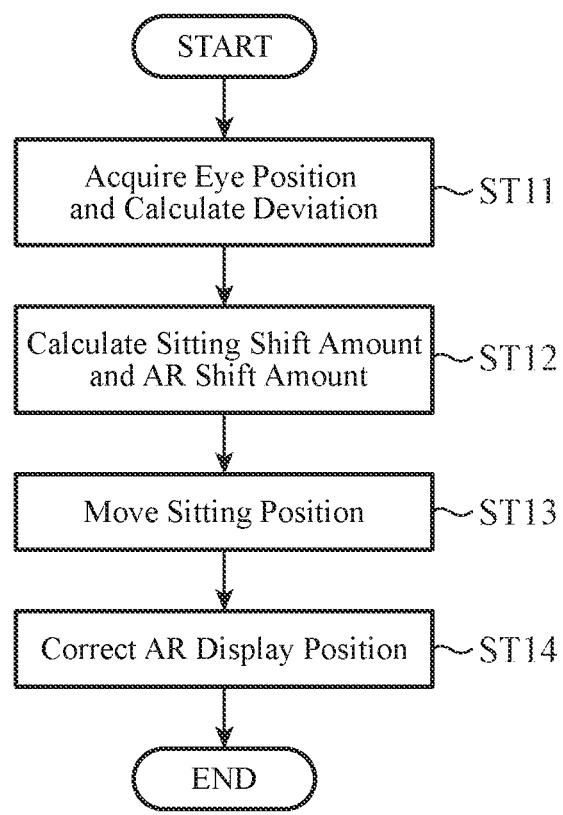
FIG. 9 is a flowchart showing a processing flow of the automatic adjuster of the embodiment 2.

Next, referring to the flowchart of FIG. 9, the processing flow of the automatic adjuster 20 in the embodiment 2 will be described.

First, if the boarding detector 2 detects that the driver enters the vehicle, the eye position detector 3 detects the height of the driver's eye position.

Thus, when the boarding detector 2 detects that the driver enters the vehicle, the deviation computing unit 11 acquires the measured value of the height of the driver's eye position from the eye position detector 3, and calculates the deviation between the measured value of the height of the driver's eye position acquired and the height of the target point of the eye position (reference position), that is, the deviation in the Y axis direction (height direction) (step ST11).

Next, the shift amount computing unit 12 calculates the sitting shift amount and the AR display shift amount in accordance with the deviation calculated by the deviation computing unit 11 and the movable range of the seat (step ST12). The AR display shift amount refers to a correction amount whereby the display position of the AR display frame (AR marker) is to be shifted from the default position.

The position controller 13 controls the seat actuator 4 in accordance with the sitting shift amount calculated by the shift amount computing unit 12, thereby causing the sitting position to be shifted (step ST13).

In addition, according to the AR display shift amount calculated by the shift amount computing unit 12, the AR display controller 14 instructs at least one of the HUD light source 6 and the optical actuator 9 to correct the AR display position by the modification of the drawing form of the display image using the HUD light source 6 and/or by the adjustment of the reference position using the optical instrument 8 (step ST14).

Thus, the automatic adjuster 20 can carryout the adjustment so as to cause the driver's eye position to agree with the target point of the eye position (reference position).

In addition, if it has completed the processing and decides that the adjustment ends, it may inform the driver that the driving support preparation has been made by sound or display. Thus, the driver can start driving after confirming that the driving support preparation has been made.

As described above, according to the present embodiment 2, even if the seat 5 has its limit on the shift in the Y axis direction (height direction), and even if the AR superimposed display can be corrected only insufficiently by the seat shift in the Y axis direction, it can carry out the eye position adjustment for the AR superimposition appropriately by causing the HUD light source 6 and/or the optical instrument 8 to modify the image itself to be superimposedly displayed and/or by correcting the reference position of the superimposed display.

Embodiment 3

Figure 10:
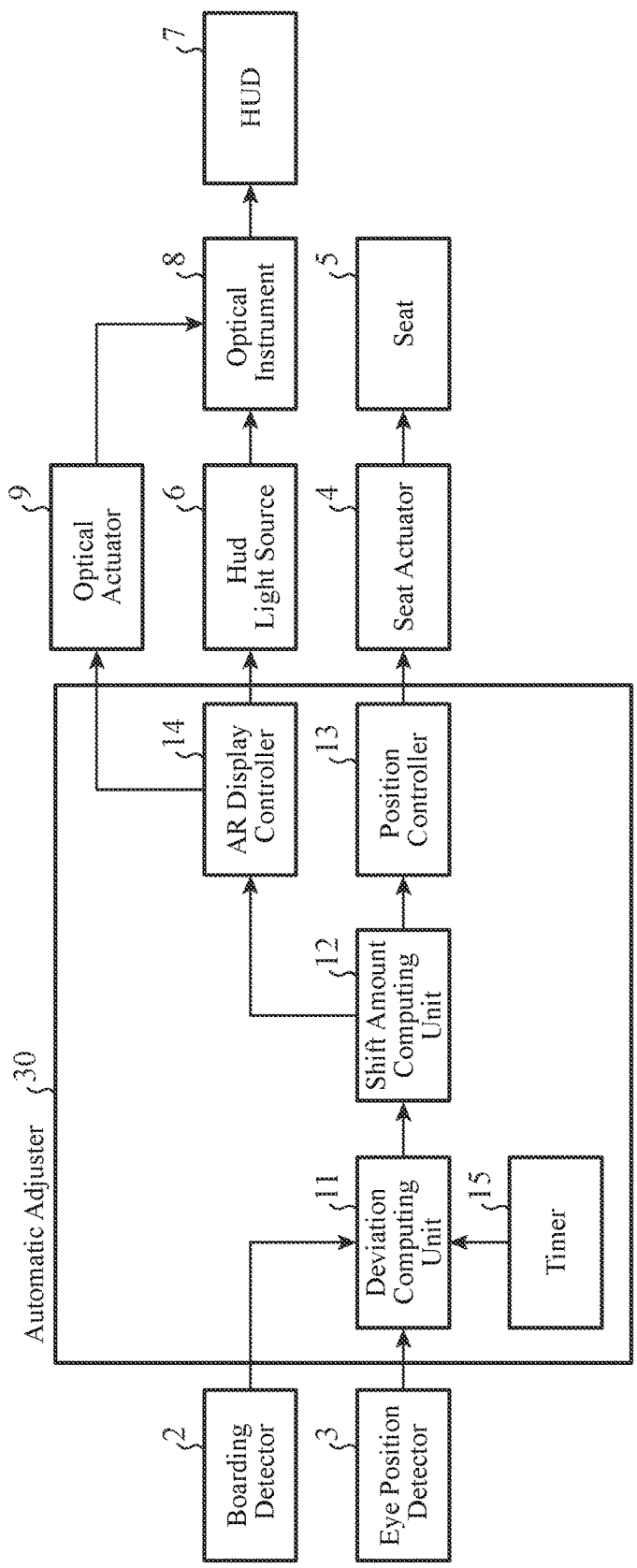
FIG. 10 is a block diagram showing an automatic adjuster of an embodiment 3 and an example of peripheral devices connected thereto.

FIG. 10 is a block diagram showing an automatic adjuster of the embodiment 3 and an example of peripheral devices connected thereto. Incidentally, the same or like components to those described in the embodiments 1 and 2 are designated by the same reference numerals and their redundant description will omitted. The automatic adjuster 30 in the embodiment 3 described below differs from the automatic adjuster 20 of the embodiment 2 shown in FIG. 8 in that it further comprises a timer 15.

When altering the position of the AR display frame (AR marker) itself, the present embodiment 3 carries out the optimum AR display taking account of the state of a driver. The term "to carryout the optimum AR display taking account of the driver" means that when the driver's position deviates such as when the driver deviates in the Z axis direction (longitudinal direction of the vehicle) which is handled as without any problem in the embodiment 1, when the posture of the driver gradually alters because of inclining his or her head or because of tiredness due to long driving hours, and when the driver deviates greatly in the lateral direction (X axis direction) as well, the present embodiment 3 considers the driver's eye position or its shift, and calculates the correction amount of the reference position of the AR display.

Thus, the present embodiment 3 offers an advantage of being able to correct the seat adjustment beyond the movable range in the following (A) and (B) carried out when the driver takes the seat (entering the vehicle), and an advantage of being able to perform in the following (C) carried out after the start of driving (during driving) the optimum AR superimposition corresponding to the shift of the eye position after the start of the driving.

Although the embodiments 1 and 2 adjust the position of the seat 5 when the driver takes the seat (gets in the vehicle), it is conceivable that only adjusting the position of the seat 5 is insufficient for carrying out the optimum AR display. Incidentally, since adjusting the position of the seat 5 during driving involves danger, it is assumed here that adjusting the position of the seat 5 can be performed only at the time when the driver takes the seat or during the time the vehicle is stopped.

More specifically, although the adjustment of the seat position in the embodiments 1 and 2 is carried out at the time of taking the seat, the present embodiment 3 can perform the adjustment even during the driving in addition to the adjustment at the time of taking the seat.

Thus, in the present embodiment 3, in addition to the adjustment of the height of the eye position by the position controller 13, the AR display controller 14 adjusts the AR superimposed display by correcting the drawing form of the image emitted from the HUD light source 6.

More specifically, the AR display controller 14 in the present embodiment 3 issues an instruction to correct the drawing form of the image emitted from the HUD light source 6 in accordance with the shift amount calculated by the shift amount computing unit 12.

For example, as a case of varying the position of the AR display itself besides the position of the seat 5, the following cases (A) and (B) are conceivable concretely. As for the position adjustment of the AR display itself, it is conceivable that the AR display controller 14 carries it out (through the HUD light source 6 that receives the instruction from the AR display controller 14, or through the optical instrument 8 that receives the instruction from the AR display controller 14).

(A) Trying to adjust the eye position only by adjusting the position of the seat 5 is unable to achieve the adjustment because of exceeding the upper limit of the seat 5 (the driver's head is about to hit the ceiling of the vehicle) or because of exceeding the lower limit.

In this case, the foregoing embodiment 2 can deal with it.

(B) Adjusting the position of the seat 5 is unable to make the driver's eye position agree with the target point of the eye position (reference position) as shown in FIG. 5.

In this case also, the present embodiment 3 can carry out the correction in such a manner as to make the AR display agree with the object by scaling (scaling up or down) or modifying the drawing form of the image emitted from the HUD light source 6, or by adjusting the position of the optical instrument 8 using the optical actuator 9.

More specifically, it can carry out the adjustment in such a manner that the target point of the eye position (reference position) agrees with the eye position after the correction (after the shift) by causing the AR display controller 14 to instruct at least one of the HUD light source 6 and the optical instrument 8 to perform the adjustment.

(C) On the other hand, when the AR display deviates from the object during driving after completing the initial adjustment at the time the driver takes the seat (enter the vehicle), the present embodiment 3 carries out the correction in such a manner as to make the AR display agree with the object by scaling (scaling up or down) or modifying the drawing form of the image emitted from the HUD light source 6.

In this case, even if the AR display frame (AR marker) deviates from the object during the driving after the initial adjustment following the driver's taking the seat, the present embodiment 3 carries out correction so as to make the AR display agree with the object by scaling (correcting by scaling up or down) or modifying the drawing form of the image emitted from the HUD light source 6.

First, the initial adjustment is made at the time of taking the seat, and the AR display frame (AR marker) corresponding to the object is displayed continuously on the HUD 7 after the start of driving. However, when the posture of the driver alters from the posture at the time of taking the seat owing to a habit of the driver or long-time driving (such as driving with his elbow placing on the door at the side of the driver), the position of the driver's head deviates with the alteration of the posture, and hence the driver's eye position can sometimes deviate as well.

In this case, since it is during driving, it is impossible to adjust the AR display frame (AR marker) to the object by shifting the seat 5.

Thus, in this case (the case of (C)), the present embodiment 3 performs the correction so as to make the AR display agree with the object by modifying the drawing form of the image the HUD light source 6 emits, or by adjusting the reference position with the optical instrument 8 using the optical actuator 9.

In this case, however, adjusting the AR display frame (AR marker) following the alteration of a temporary alteration of the eye position of the driver such as in not greater than 30 seconds, for example, will result in uncomfortableness for the driver to watch it because of the frequent repetition of the adjustment, which is almost meaningless.

Thus, a timer event is generated at every 10 minutes from a key-on, for example, to check whether the posture of the driver does not deviate so much from the initially adjusted state, that is, whether the deviation between the eye position and the target point (reference position) is not less than the predetermined specified value or not. If the deviation is less than the specified value (does not deviate so much), since it is not necessary to correct the AR display, the processing is terminated and waits for the next 10 minutes.

On the other hand, if the posture of the driver deviates from the initial adjustment beyond a prescribed allowable range at the occurrence of the timer event (if the deviation between the eye position and the target point (reference position), (that is, if the deviation in the height direction, the deviation in the lateral direction, and the deviation in the longitudinal direction of the vehicle are not less than the predetermined specified value), the present embodiment 3 decides whether correction of the AR display is necessary or not.

More specifically, if the state deviating from the prescribed allowable range (displacement count) continues for not less than a predetermined time (30 seconds, for example), the present embodiment 3 decides that the posture of the driver alters, and carries out the correction of the AR display (correction in the height direction, correction in the lateral direction and/or correction in the longitudinal direction of the vehicle).

In addition, even if the posture of the driver deviates from the initially adjusted state by more than the prescribed allowable range, if the state continues only less than the predetermined time, the present embodiment 3 decides that it is only a transient posture alteration, and does not carry out the correction of the AR display.

The present embodiment 3 that puts the foregoing technical idea into practice will be described in detail.

As for the configuration of the present embodiment 3, it is the same as that of the embodiment 2 except that it comprises the timer 15.

If the eye position does not reach the target point (reference position) by the shift of the seat such as when the deviation calculated by the deviation computing unit 11 exceeds the movable range of the seat 5, it is preferable to shift the reference position in the superimposed display by the optical instrument 8, or to modify the image itself emitted from the HUD light source 6.

For this reason, the shift amount computing unit 12 of the embodiment 3 calculates the shift amount of the seat 5 and the correction amount of the reference position of the AR display in accordance with the deviation calculated by the deviation computing unit 11. Likewise, as for the deviation in the lateral direction, since it is often impossible to reach the target point of the eye position (reference position) by the shift of the seat 5, it is preferable to deal with it by the correction of the reference position of the AR display rather than by using the shift amount of the seat 5.

In addition, as to the alteration of the eye position such as due to the alteration of the posture like inclining the head detected at a time other than at the time of taking the vehicle, the shift amount computing unit 12 calculates the correction amount of the reference position of the AR display. As for the AR display correction other than at the time of taking the vehicle, it need not be performed continuously, but can be carried out only when the deviation in the lateral direction continues for not less than a predetermined specified time.

Then, according to the correction amount of the reference position of the AR display calculated by the shift amount computing unit 12, the AR display controller 14 corrects the AR display position by modifying the image display frame which is projected onto the HUD 7 by the HUD light source 6 or optical instrument 8.

As for the processing flow at the time of taking the vehicle (at the initial adjustment), since it is the same as the processing flow described with reference to the flowchart shown in FIG. 9 in the embodiment 2, its drawing and description will be omitted here. However, the initial adjustment controls the driver's eye position and the target point of the eye position (reference position) so as to make them agree with each other.

Figure 11:
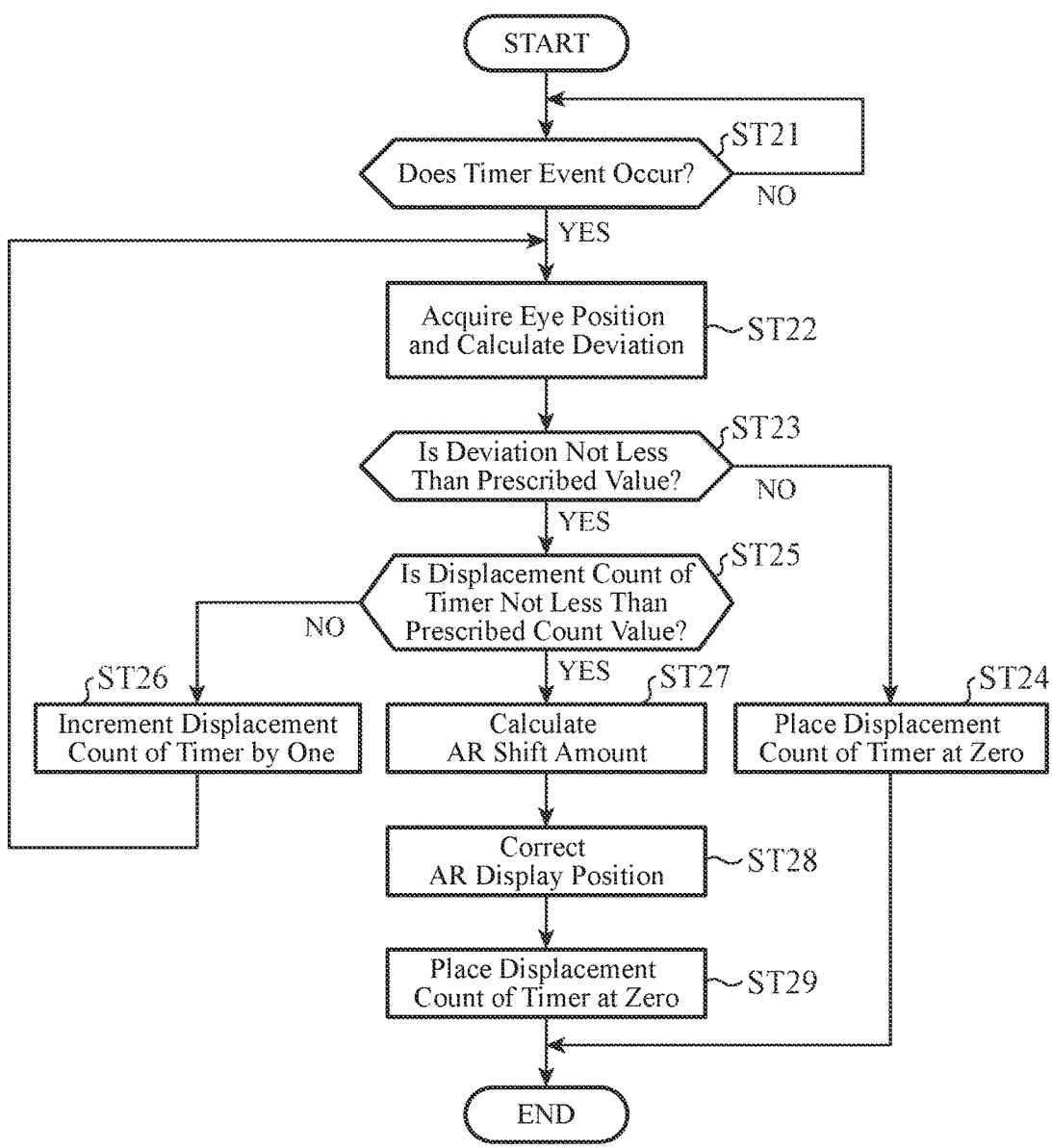
FIG. 11 is a flowchart showing a processing flow of the automatic adjuster of the embodiment 3 after its operation start.

Next, referring to the flowchart of FIG. 11, the processing flow of the automatic adjuster 30 in the embodiment 3 after the start of driving will be described.

First, while the boarding detector 2 detects that the driver is in the vehicle, the timer 15 generates a timer event at every predetermined time period (every 10 minutes, for example), and the eye position detector 3 detects the driver's eye position.

When the timer event occurs (YES at step ST21), the deviation computing unit 11 acquires the driver's eye position information from the eye position detector 3, and calculates the deviation from the target point (reference position) (step S122). At this time, the deviation computing unit 11 calculates the deviation not only in the height direction (Y axis direction), but also in the lateral direction (X axis direction) and in the longitudinal direction (Z axis direction) of the vehicle.

More specifically, the deviation computing unit 11 calculates the deviation (the deviation in the height direction, the deviation in the lateral direction, and the deviation in the longitudinal direction) between the measured value of the driver's eye position when the driver takes the seat 5 (the measured value in the height direction, the measured value in the lateral direction when seen from the front of the vehicle, and the measured value in the longitudinal direction of the vehicle) and the reference position of the predetermined superimposed display displayed on the HUD 7 set in the vehicle.

If the deviation is less than the predetermined specified value (NO at step ST23), the automatic adjuster 30 places the displacement count of the timer 15 at zero (step ST24), and terminates the processing.

Thus, the term "displacement count of the timer 15" refers to the counter for measuring the continuous time during which the eye position deviates from the reference position.

On the other hand, if the deviation calculated at step ST22 is not less than the predetermined specified value (YES at step S123), the automatic adjuster 30 decides whether the displacement count of the timer 15 is not less than the predetermined specified count value or not (step ST25). For example, on the assumption that the count value corresponding to 30 seconds is set as the prescribed count value here, it decides whether the displacement count is not less than the count value corresponding to the 30 seconds or not.

If the displacement count of the timer 15 is less than the prescribed count value (NO at step ST25), since the altered state of the eye position (continuation of the alteration) does not meet the prescribed time, the automatic adjuster 30 decides that the driver's eye position deviates only temporarily. In this case, it decides that the AR display correction is not necessary at the present, adds one count to the displacement count of the timer 15 (step ST26), and returns to step ST22 to repeat from the processing of acquiring the driver's eye position and calculating the deviation. Incidentally, the detection of the eye position by the eye position detector 3 is performed at every prescribed timing.

On the other hand, if the displacement count of the timer 15 is not less than the prescribed count value (YES at step ST25), since the state in which the eye position deviates continues for more than the prescribed time, 30 seconds, the automatic adjuster 30 decides that the posture of the driver varies from the posture at the time of taking the seat, and executes the AR display correction. More specifically, the shift amount computing unit 12 calculates the AR display shift amount in accordance with the deviation calculated by the deviation computing unit 11 (step ST27).

Then, according to the AR display shift amount calculated by the shift amount computing unit 12, the AR display controller 14 instructs at least one of the HUD light source 6 and the optical actuator 9 to modify the drawing of the display image by the HUD light source 6 and/or to correct the AR display by the adjustment of the optical instrument 8 (step ST28). After completing the display correction, the automatic adjuster 30 resets the displacement count of the timer 15 (step ST29), and terminates the processing.

More specifically, when the deviation in the height direction, the deviation in the lateral direction, the deviation in the longitudinal direction are not less than the predetermined value, and if this state continues for not less than the predetermined time, the AR display controller 14 instructs the HUD light source 6 to correct the drawing form of the image in the height direction, to correct it in the lateral direction, and/or to correct the scaling of the drawing form of the image, and/or instructs the optical instrument 8 to correct the reference position in a superimposed display in the height direction, in the lateral direction, and/or in the longitudinal direction.

Incidentally, when the posture of the driver alters only temporarily, the posture of the driver will return to its original position soon. In this case, even if the posture of the driver deviates, and the decision at step ST23 indicates that the deviation is not less than the specified value and the displacement count of the timer 15 is counted up, the posture of the driver will return to its original position before the count value of the displacement count reaches the value corresponding to the 30 seconds (prescribed count value).

Thus, the deviation of the driver's eye position becomes less than the specified value, and hence the displacement count of the timer 15 is reset and the processing is terminated.

In this way, only when the deviation (the deviation in the height direction, the deviation in the lateral direction, the deviation in the longitudinal direction) is not less than the predetermined value, and this state continues for not less than the predetermined time, the automatic adjuster 30 carries out the correction of the AR superimposed display by the HUD light source 6 or the optical instrument 8 (correction in the height direction, correction in the lateral direction, correction in the longitudinal direction). Accordingly, if the posture of the driver alters only temporarily, the AR display correction is not performed.

Incidentally, as for the predetermined value used for deciding whether the deviation is not less than the predetermined value or not, different values can be set for the deviation in the height direction, the deviation in the lateral direction, and the deviation in the longitudinal direction, respectively.

As described above, according to the present embodiment 3, it can correct not only the eye position at the time of entering the vehicle, but also the AR display for the eye position after the start of driving, but does not respond to a temporary shift of the eye position. Accordingly, it can perform the optimum AR superimposed display corresponding to the alteration of the posture of the driver.

Embodiment 4

Figure 12:
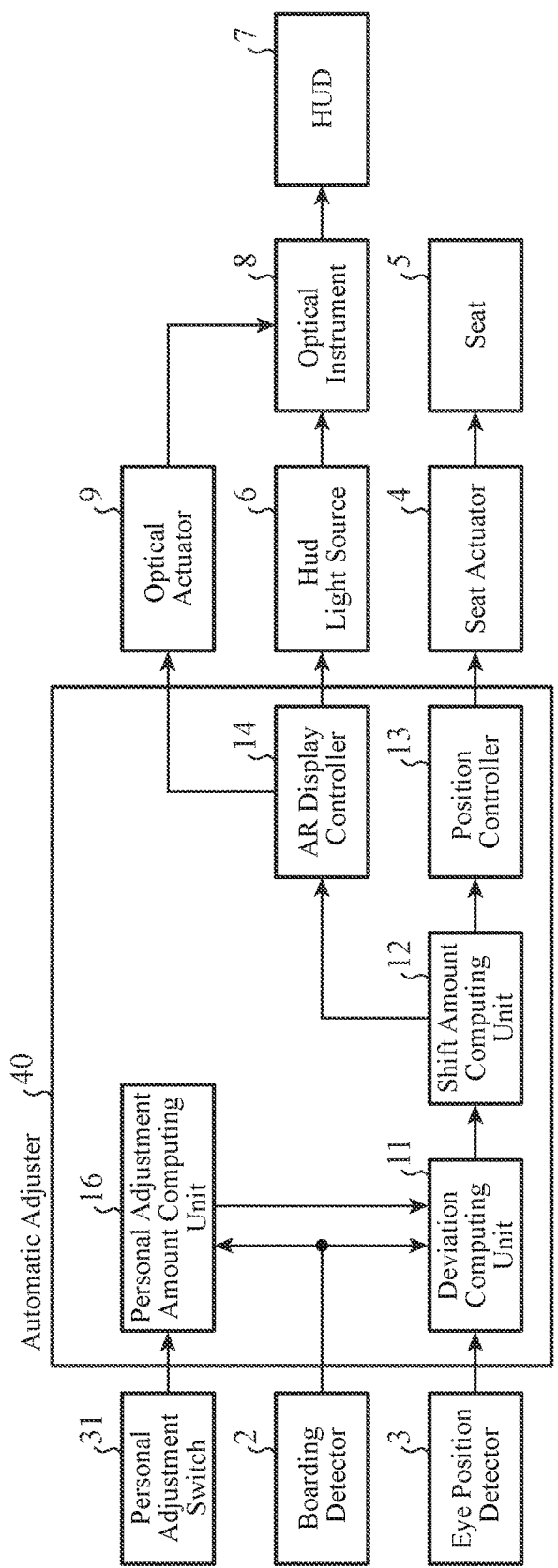
FIG. 12 is a block diagram showing an automatic adjuster of an embodiment 4 and an example of peripheral devices connected thereto.

FIG. 12 is a block diagram showing an automatic adjuster of an embodiment 4 and an example of peripheral devices connected thereto. Incidentally, the same or like components to those described in the embodiments 1-3 are designated by the same reference numerals and their redundant description will omitted. The automatic adjuster 40 of the embodiment 4 shown below differs from the automatic adjuster 20 shown in FIG. 8 of the embodiment 2 in that it further comprises a personal adjustment amount computing unit 16 which is connected to a personal adjustment switch 31.

The present embodiment 4 is for carrying out the optimum AR display by reflecting a personal effect such as a dominant eye besides the functions of the embodiment 2. It is assumed here that the personal adjustment amount computing unit 16 is capable of deciding at least a dominant eye of the driver.

Figure 13:
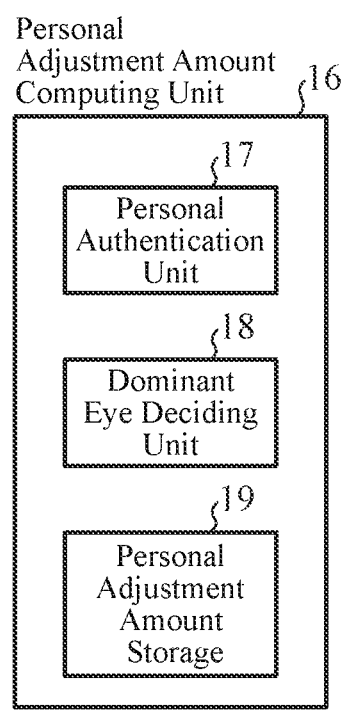
FIG. 13 is a block diagram showing a configuration of the personal adjustment amount computing unit in the embodiment 4.

FIG. 13 is a block diagram showing a configuration of the personal adjustment amount computing unit 16. As shown in FIG. 13, the personal adjustment amount computing unit 16 comprises a personal authentication unit 17, a dominant eye deciding unit 18 and a personal adjustment amount storage 19.

The personal adjustment amount computing unit 16 starts calculating the personal adjustment amount when the boarding detector 2 detects that the driver enters the vehicle, or that the personal adjustment switch 31 equipped in the vehicle is pushed down. Thus, when it calculates the personal adjustment amount using as a trigger the detection of the driver's entering the vehicle with the boarding detector 2, the personal adjustment switch 31 is dispensable.

The personal authentication unit 17 authenticates the person by an image of the driver's face acquired with a camera. Incidentally, although an example of the camera authentication is shown here, the person can be authenticated by means of voice or biometric information, or a cellular phone.

The personal adjustment amount storage 19 is a storage for storing the personal adjustment amount such as the dominant eye information for each person identified.

Incidentally, when identifying a person by authentication by means of voice, biometric information, or a cellular phone, the personal adjustment amount computing unit 16 is provided not with the signal from the boarding detector 2, but with a signal from a voice recognition unit, a biometric information signal from a biometric information detector, or an individual identification signal from an individual identification device for recognizing the individual identification number of the cellular phone.

The dominant eye deciding unit 18 decides a dominant eye different from person to person. Like right-handedness and left-handedness, eyes have a dominant eye. A dominant eye refers to an eye used for bringing an object into focus, and it is known that a non-dominant eye complements the dominant eye by roughly catching the whole or ground of an object. Accordingly, by grasping the dominant eye from person to person, and by adjusting the AR display using the position of the dominant eye as a reference, more accurate AR superimposed display adaptive to the individual can be carried out.

As a deciding method of the dominant eye by the dominant eye deciding unit 18, the following techniques (1) to (4) can be employed.

(1) Deciding the dominant eye by asking the driver to shift his or her face while opening both eyes in such a manner that a marking displayed on a transparent panel set on this side appears to coincide with a target object set in the depths of the panel.

For example, while displaying, by using an intelligent panel and a meter display, an arrow on the protective glass and an object on the meter panel, ask the driver to shift his or her head to the position where the arrow and the object appear to coincide with each other, and decide, from the eye position at that time, the position of the dominant eye.

Incidentally, as a trigger for starting the decision of the dominant eye, the personal adjustment switch 31 can be used.

(2) Deciding the dominant eye from an error or variation obtained by measuring a feature of movement of both eyes with a line-of-sight detector.

As described before, the dominant eye is used to bring an object into focus, and the non-dominant eye is used to catch the whole image to compliment the dominant eye. Accordingly, it is supposed that the point of gaze of the non-dominant eye is more inaccurate as to the variation and error than the point of gaze of the dominant eye.

(3) Deciding the dominant eye from surface parameters of the eyes (eyeballs) obtained during calibration or fixed gazing.

Incidentally, in the cases of (2) and (3), the personal adjustment switch 31 is unnecessary.

(4) Deciding the dominant eye by a method that a driver inputs the dominant eye information manually with buttons or the like. In this case, for example, it is possible to enable inputting the dominant eye information using the personal adjustment switch 31.

Incidentally, it is known that the ratio of a right-hand dominant eye is higher in general. Accordingly, the default value of a dominant eye may be set at right.

Then, the deviation computing unit 11 in the present embodiment 4 calculates the deviation between the target point (reference position) of the eye position and the position of the dominant eye of the driver. Only, the deviation calculated here reflects the personal adjustment amount such as the dominant eye information the personal adjustment amount computing unit 16 calculates (decides).

Figure 14:
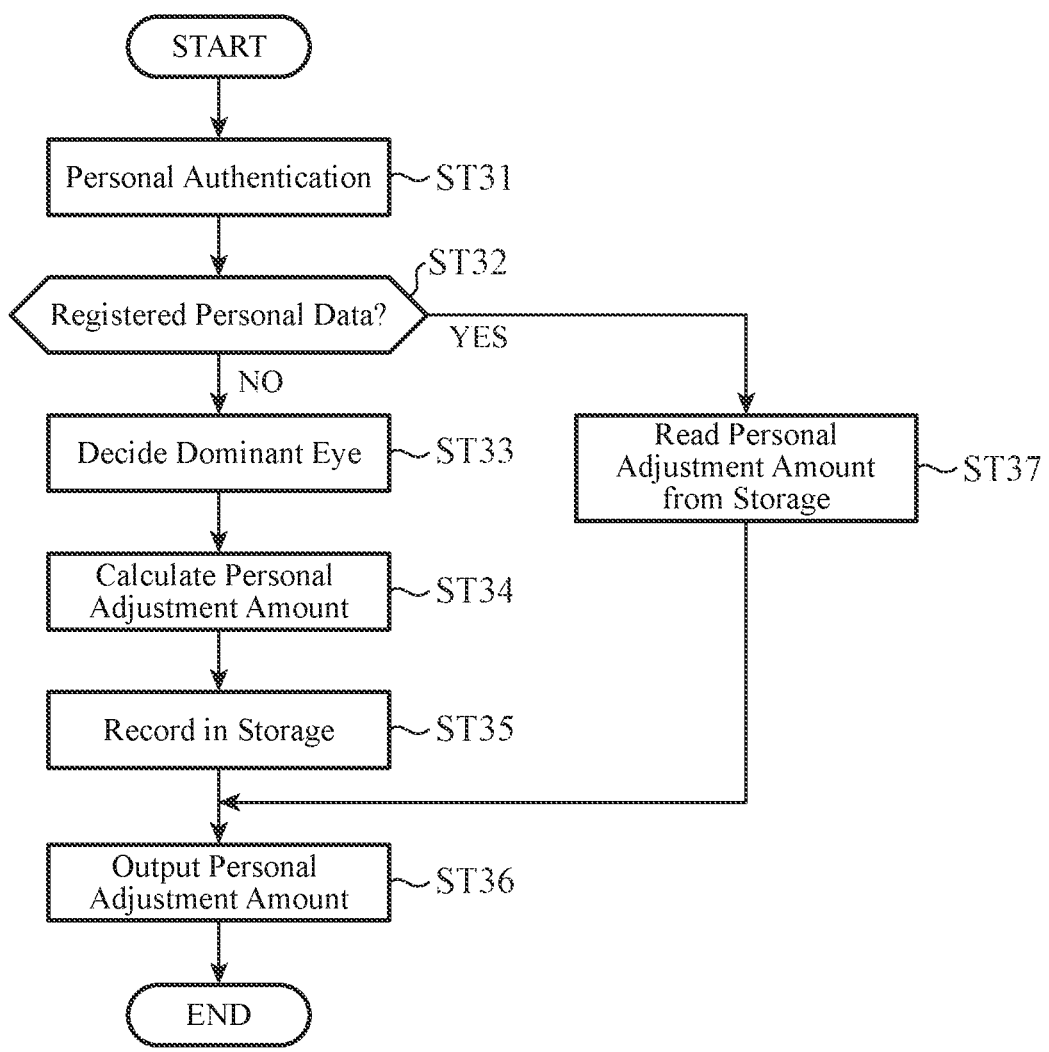
FIG. 14 is a flowchart showing a processing flow of the personal adjustment amount computing unit of the embodiment 4.

Referring to the flowchart of FIG. 14, the processing flow of the personal adjustment amount computing unit 16 in the embodiment 4 will be described.

The personal adjustment amount computing unit 16 starts the personal adjustment processing when the boarding detector 2 detects that the driver enters the vehicle, or when pushing down of the personal adjustment switch 31 equipped in the vehicle is detected.

First, the personal authentication unit 17 carries out personal authentication using a face recognition function or the like (step ST31).

Then, the personal adjustment amount computing unit 16 decides whether the personal adjustment amount data of the identified individual has been stored in the personal adjustment amount storage 19 or not (step ST32).

If the data has not been recorded or stored (NO at step ST32), the dominant eye deciding unit 18 decides the dominant eye of the driver (step ST33).

According to the dominant eye information decided, the personal adjustment amount computing unit 16 calculates the personal adjustment amount fit for the driver (step ST34), and records it in the personal adjustment amount storage 19 (step ST35).

After that, it outputs the personal adjustment amount it calculates to the deviation computing unit 11 (step ST36), and terminates the processing as to the personal adjustment processing.

On the other hand, if the decision at step ST32 shows that the personal adjustment amount data of the identified individual has already been recorded or stored in the personal adjustment amount storage 19 (step ST32 YES at), the personal adjustment amount computing unit 16 reads the personal adjustment amount from the personal adjustment amount storage 19 (step ST37), and outputs the personal adjustment amount to the deviation computing unit 11 (step ST36).

As for the seat position adjustment and the AR display correction processing after that, since they are the same as those described in the embodiments 1-3, their drawings and description will be omitted.

Incidentally, although the description is made using mainly the dominant eye information as the personal adjustment amount here, it is supposed here that even though the dominant eye is the same, the personal adjustment amount includes an adjustment amount due to the deviation in visibility of a person.

This enables reflecting the personal effect such as a dominant eye on the correction, thereby being able to implement the very optimum AR display.

As described above, according to the present embodiment 4, since it reflects the adjustment amount due to the personal effect such as a dominant eye on the calculation of the shift amount, the present embodiment 4 is able to implement the very optimum AR display in addition to the advantages of the embodiment 2.

Incidentally, in the foregoing embodiment 4, although the example that comprises the personal adjustment amount computing unit 16 in addition to the configuration and processing shown in the embodiment 2 is described, it goes without saying that the processing of the foregoing embodiment 4 can also be executed by adding the personal adjustment amount computing unit 16 to the configuration and processing of the embodiment 1 or embodiment 3.

Incidentally, it is to be understood that a free combination of the individual embodiments, variations of any components of the individual embodiments or removal of any components of the individual embodiments is possible within the scope of the present invention.

INDUSTRIAL APPLICABILITY

An automatic adjuster in accordance with the present invention is applicable to any equipment provided in a vehicle like a car, such as onboard equipment like a car navigation system and a dashboard. In addition, the automatic adjuster itself can be incorporated into the equipment.

DESCRIPTION OF REFERENCE SYMBOLS 1, 20, 30, 40 automatic adjuster; 2 boarding detector; 3 eye position detector; 4 seat actuator; 5 seat (power seat); 6 HUD light source; 7 head-up display (HUD); 8 optical instrument; 9 optical actuator; 10 automatic adjusting system; 11 deviation computing unit; 12 shift amount computing unit; 13 position controller; 14 AR display controller; 15 timer; 16 personal adjustment amount computing unit; 17 personal authentication unit; 18 dominant eye deciding unit; 19 personal adjustment amount storage; 31 personal adjustment switch; 50 vehicle; 51, 52 seat rail; 60 driver; 61 driver's eyes; 70 reference position in a superimposed display (target point of eye position); 71 AR marker display position; 100 object; 101 AR display frame (AR marker).

What is claimed is:

1. An automatic adjuster capable of automatically shifting a driver's seat a driver of a vehicle takes, the automatic adjuster comprising:
    a deviation calculator to calculate a deviation between a measured value of a height of the driver's eye position when the driver takes the seat and a height of a predetermined reference position in a superimposed display which is displayed on a head-up display equipped in the vehicle;
    a shift amount calculator to calculate, when the deviation calculated by the deviation calculator is not less than a predetermined value, a shift amount by which the seat is to be shifted in a direction that reduces the deviation; and
    a position controller to control a shift of the seat by giving a driving instruction to a seat actuator capable of driving and shifting the seat in accordance with the shift amount calculated by the shift amount calculator, thereby adjusting the height of the driver's eye position and the height of the reference position in the superimposed display when the driver takes the seat.

2. The automatic adjuster according to claim 1, wherein when the seat is capable of being shifted not only in a height direction but also in a longitudinal direction of the vehicle when shifted by the seat actuator;
    the position controller adjusts a driving amount instructed to the seat actuator by considering the shift amount in the longitudinal direction.

3. The automatic adjuster according to claim 2, further comprising:
    when the seat has a limiting value as to the shift in the height direction, and the shift amount calculated by the shift amount calculator exceeds the limiting value of the shift in the height direction;
    an AR display controller to instruct, in accordance with the shift amount calculated by the shift amount calculator, an HUD light source, which emits an image to be superimposed on the head-up display, to correct a drawing form of the image in the height direction, or an optical instrument, which projects an image emitted from the HUD light source onto the head-up display, to correct the reference position on the superimposed display in the height direction.

4. The automatic adjuster according to claim 1, wherein the position controller decides that the adjustment has been completed when the deviation calculated by the deviation calculator becomes less than the predetermined value, and informs the driver that driving support preparation has been completed.

5. The automatic adjuster according to claim 1, further comprising:
    an AR display controller to output, in accordance with the shift amount calculated by the shift amount calculator, an instruction to correct a drawing form of an image emitted from an HUD light source that emits the image to be superimposedly displayed on the head-up display, or to instruct an optical instrument, which projects the image emitted from the HUD light source onto the head-up display, to correct the reference position in the superimposed display.

6. The automatic adjuster according to claim 5, wherein the deviation calculator further calculates a deviation in the lateral direction between a measured value in the lateral direction of the driver's eye position which is seen from the front of the vehicle when the driver takes the seat and the predetermined reference position in the superimposed display which is displayed on the head-up display; and
    the AR display controller, when the deviation in the lateral direction is not less than a predetermined value and a state in which the deviation is not less than the predetermined value continues for not less than a predetermined time, instructs the HUD light source that emits the image to be superimposedly displayed on the head-up display to correct the drawing form of the image in the lateral direction, or instructs the optical instrument for projecting the image emitted from the HUD light source onto the head-up display to correct the reference position in the superimposed display in the lateral direction.

7. The automatic adjuster according to claim 5, wherein the deviation calculator further calculates a deviation in the longitudinal direction between a measured value in the longitudinal direction of the driver's eye position when the driver takes the seat and the predetermined reference position in the superimposed display which is displayed on the head-up display; and
    the AR display controller, when the deviation in the longitudinal direction is not less than a predetermined value and a state in which the deviation is not less than the predetermined value continues for not less than a predetermined time, instructs the HUD light source that emits the image to be superimposedly displayed on the head-up display to correct scaling of the drawing form of the image, or instructs the optical instrument for projecting the image emitted from the HUD light source onto the head-up display to correct the reference position in a superimposed display in the longitudinal direction.

8. The automatic adjuster according to claim 1, further comprising:
    a personal adjustment amount calculator to decide a dominant eye at least of the driver, wherein
    the deviation calculator calculates the deviation between the reference position in the superimposed display and the position of the dominant eye of the driver decided by the personal adjustment amount calculator.

9. An automatic adjusting system capable of automatically shifting a driver's seat a driver of a vehicle takes, the automatic system comprising:
    an eye position detector to detect the driver's eye position when the driver takes the seat;
    a seat actuator capable of shifting the seat by driving the seat;

a deviation calculator to calculate a deviation between a measured value of a height of the driver's eye position detected by the eye position detector and a height of a predetermined reference position in a superimposed display which is displayed on a head-up display equipped in the vehicle;

a shift amount calculator to calculate, when the deviation calculated by the deviation calculator is not less than a predetermined value, a shift amount by which the seat is to be shifted in a direction that reduces the deviation; and a position controller to control a shift of the seat by giving a driving instruction to the seat actuator in accordance with the shift amount calculated by the shift amount calculator, thereby adjusting the height of the driver's eye position and the height of the reference position in a superimposed display when the driver takes the seat.

10. An automatic adjusting method capable of automatically shifting a driver's seat a driver of a vehicle takes, the automatic adjusting method comprising:

calculating, by a deviation calculator, a deviation between a measured value of a height of a driver's eye position when the driver takes the seat and a height of a predetermined reference position in a superimposed display which is displayed on a head-up display equipped in the vehicle;

calculating, by a shift amount calculator, when the deviation calculated by the deviation calculator is not less than a predetermined value, a shift amount by which the scat is to be shifted in a direction that reduces the deviation; and controlling, by a position controller, a shift of the seat by giving a driving instruction to a seat actuator capable of driving and shifting the seat in accordance with the shift amount calculated by the shift amount calculator, thereby adjusting the height of the driver's eye position and the height of the reference position in a superimposed display when the driver takes the seat.

* * * * *